(12) United States Patent
Villarreal et al.

(10) Patent No.: US 10,255,400 B1
(45) Date of Patent: Apr. 9, 2019

(54) DEBUGGING SYSTEM AND METHOD

(71) Applicant: Xilinx, Inc., San Jose, CA (US)

(72) Inventors: Jason Villarreal, Los Gatos, CA (US);
Xiaoyong Liu, San Jose, CA (US);
Kumar Deepak, San Jose, CA (US)

(73) Assignee: XILINX, INC., San Jose, CA (US)

( * ) Notice: Subject to any disclaimer, the term of this patent is extended or adjusted under 35 U.S.C. 154(b) by 58 days.

(21) Appl. No.: 15/473,883

(22) Filed: Mar. 30, 2017

(51) Int. Cl.
*G06F 17/50* (2006.01)

(52) U.S. Cl.
CPC ........ *G06F 17/505* (2013.01); *G06F 17/5054* (2013.01)

(58) Field of Classification Search
CPC ............................ G06F 17/505; G06F 17/5054
See application file for complete search history.

(56) References Cited

U.S. PATENT DOCUMENTS

| | | | |
|---|---|---|---|
| 5,995,744 A | 11/1999 | Guccione | |
| 6,212,650 B1 | 4/2001 | Guccione | |
| 6,985,980 B1 | 1/2006 | Allegrucci | |
| 7,308,564 B1 | 12/2007 | Jenkins, IV | |
| 7,640,526 B1 * | 12/2009 | Blodget | G06F 17/5054 703/22 |
| 7,805,593 B1 | 9/2010 | Donlin | |
| 8,327,200 B1 | 12/2012 | Mohan | |
| 8,595,555 B1 | 11/2013 | Taylor | |
| 8,595,561 B1 | 11/2013 | Lu et al. | |
| 2003/0131324 A1 * | 7/2003 | Takenaka | G06F 17/504 716/103 |
| 2014/0115566 A1 * | 4/2014 | Cao | G06F 9/4498 717/129 |

OTHER PUBLICATIONS

U.S. Appl. No. 15/334,182, Villarreal, Jason et al., filed Oct. 25, 2016.
U.S. Appl. No. 15/451,068, Villarreal, Jason et al., filed Mar. 6, 2017.
Eager, Michael J. et al., "Introduction to the DWARF Debugging Format", Eager Consulting, 11 pgs., Apr. 2012.

* cited by examiner

*Primary Examiner* — Nha T Nguyen
(74) *Attorney, Agent, or Firm* — LeRoy D. Maunu (57) ABSTRACT

Disclosed approaches for configuring a memory include generating by a high-level synthesis (HLS) tool executing on a computer system, a first mapping of elements of a high-level language (HLL) program to elements of a hardware language finite state machine that represents a circuit implementation of the HLL program. The HLS tool further generates a second mapping of lines of the HLL program to states of the hardware language finite state machine and stores the information describing the first mapping and the second mapping in a data structure of a database in the memory.

18 Claims, 8 Drawing Sheets

```
1: void vadd(const int* input, int* output)
2: {
3:   int counter ;
4:   unsigned int i ;
5:
6:   counter = 1 ;
7:   for (i = 0 ; i < 25 ; ++i)
8:   {
9:     output[i] = input[i] + counter ;
10:    counter += 1 ;
11:  }
12: }
```

```
// The RTL signals that correspond to
//   the high level language variable "counter"
reg [4:0] vadd_counter_reg_95;
reg [4:0] ap_pipeline_reg_iter1_vadd_counter_reg_95;
reg [4:0] ap_pipeline_reg_iter2_vadd_counter_reg_95;
reg [4:0] ap_pipeline_reg_iter3_vadd_counter_reg_95;
reg [4:0] ap_pipeline_reg_iter4_vadd_counter_reg_95;
reg [4:0] ap_pipeline_reg_iter5_vadd_counter_reg_95;
reg [4:0] ap_pipeline_reg_iter6_vadd_counter_reg_95;
reg [4:0] ap_pipeline_reg_iter7_vadd_counter_reg_95;
reg [4:0] ap_pipeline_reg_iter8_vadd_counter_reg_95;

// Additional HLS generated code...

// The RTL statement that executes the lines:
//   "counter += 1" and "counter = 1"
always @ (posedge ap_clk) begin
  if (((1'b1 == ap_CS_fsm_pp0_stage0)   &
       (1'b1 == ap_enable_reg_pp0_iter0) &
       (1'b0 == exitcond_fu_146_p2)))
  begin
    vadd_counter_reg_95 <= p_reg2mem_0_i_i_fu_152;
  end
  else if (((ap_CS_fsm_state1 == 1'b1) &
           ~(1'b0 == ap_start)))
  begin
    vadd_counter_reg_95 <= ap_const_lv5_0;
  end
end
```

DEBUGGING SYSTEM AND METHOD

TECHNICAL FIELD

The disclosure generally relates to debugging software that has been transformed into a hardware description using a software debugger.

BACKGROUND

One technique for improving performance of a software system is to implement selected sections as hardware accelerators. Those sections of the system that exhibit high computational complexity and consume large portions of total runtime may be suitable candidates for implementing as hardware accelerators. The hardware accelerators could be application specific integrated circuits (ASICs), graphics processing units (GPUs), or circuitry running on field programmable gate arrays (FPGAs), for example. A common approach employed by software designers in creating a hardware accelerator is to use a high-level synthesis (HLS) tool to convert the original high-level language (HLL) specification of the identified section into an equivalent register transfer level (RTL) or other hardware description language (HDL) specification of the circuit.

Although the generated RTL specification may be functionally identical to the HLL specification, the software designer may need to debug the RTL specification in the course of system development. Issues involving timing, concurrency and race conditions may have been masked when developing the HLL specification and can surface during hardware simulation. Also, differences in software and hardware library implementations, incorrect translation, or differences in memory access can create implementation problems.

Debugging of RTL implementations can be facilitated through simulators such as the VIVADO® simulator from XILINX, Inc., or the QUESTA® simulator from Mentor Graphics Corporation. In testing the RTL implementation, the software designer traces low-level signals and registers and interpret waveforms.

SUMMARY

In one implementation, a memory is disclosed for storing data for access by a debugging program executed on a data processing system. The memory stores a data structure, and the data structure includes information resident in a database used by the debugging program. The data structure includes a first mapping of elements of a high-level language (HLL) program to elements of a hardware language finite state machine that represents a circuit implementation of the HLL program. The data structure further includes a second mapping of lines of the HLL program to states of the hardware language finite state machine.

A method of configuring a memory includes generating by a high-level synthesis (HLS) tool executing on a computer system, a first mapping of elements of a high-level language (HLL) program to elements of a hardware language finite state machine that represents a circuit implementation of the HLL program. The HLS tool further generates a second mapping of lines of the HLL program to states of the hardware language finite state machine and stores the information describing the first mapping and the second mapping in a data structure of a database in the memory.

A debugging system includes a processor and a memory arrangement. The memory arrangement is configured with instructions that when executed by the processor cause the processor to generate a first mapping of elements of a high-level language (HLL) program to elements of a hardware language finite state machine that represents a circuit implementation of the HLL program. The processor also generates a second mapping of lines of the HLL program to states of the hardware language finite state machine. The processor then stores the information describing the first mapping and the second mapping in a data structure of a database in the memory.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The debugging environment with which a software designer may be familiar differs substantially from the debugging environment provided by RTL simulators. Software debuggers provide capabilities such as setting breakpoints at specific instructions or lines of sequentially executing program code and inspecting and editing variables, the values of which may be stored in registers or memory during program execution. The software debugger presents debug information at the source code level, which allows the software designer to easily correlate desired actions of the software debugger and state of the executing program with HLL program names and statements.

The debugging environments provided by an RTL simulator and a logic analyzer operate at the signal level. The RTL simulator and logic analyzer provide the ability to set breakpoints based on signal states, trace signal states, view waveforms, and inspect registers. However, the software designer may be unfamiliar with the RTL and circuit structure and unfamiliar with the association between elements of the HLL program and the signal names and particular registers in the RTL structure. Thus, a software designer can be hindered from timely debugging a hardware accelerator.

The disclosed methods and systems bridge the gap between the software debugging environment with which software designers are familiar and the RTL debugging and logic analyzer environments available to hardware designers. The methods and systems support debugging features that are found in software debuggers, such as setting breakpoints at particular lines of HLL program code, inspecting the values of variables by HLL names of the variables and inspecting the contents of memory. The system handles the mapping between HLL constructs and RTL constructs and between RTL constructs and circuit elements. The mappings allow the software designer to debug the hardware accelerator as if operating in the software debugger environment.

The disclosed implementations provide a cross-reference database that supports debugging through simulation of the hardware accelerator or debugging through operation of a circuit implementation of the hardware accelerator. The cross-reference database is stored as a data structure in a memory that is accessible to a debugging program executing on a data processing system. The data structure includes information that describes multiple mappings. One mapping cross-references elements of an HLL program to elements of a hardware model that represents a circuit implementation of the HLL program. Another mapping in the data structure cross-references lines of the HLL program to states of the hardware model.

Figure 1:
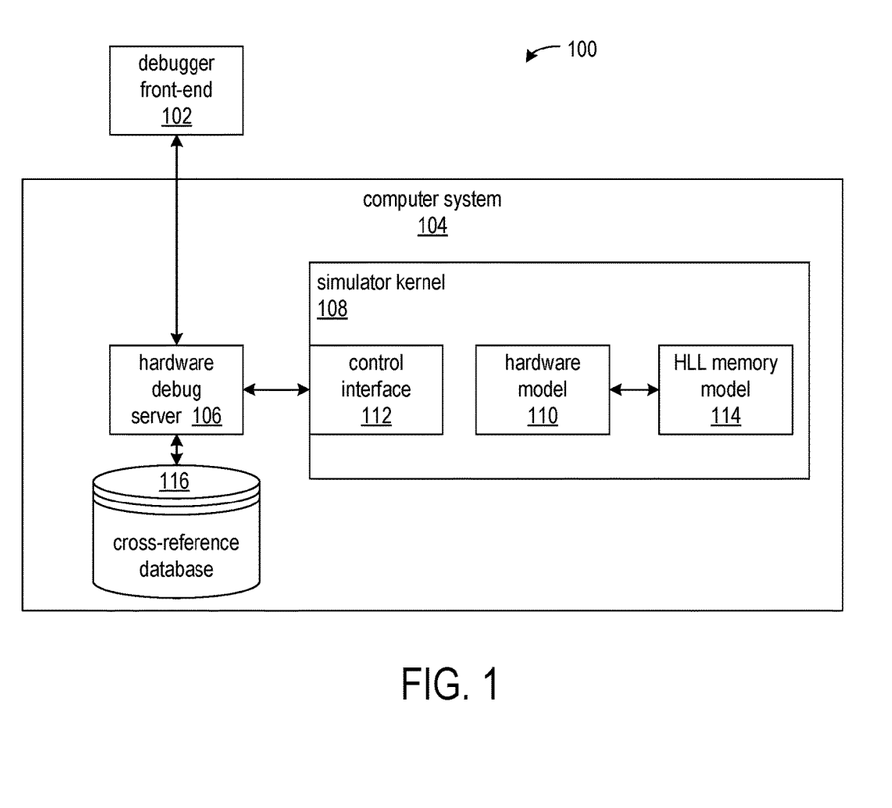
FIG. 1 shows a debugging system in which the mapping of HLL program information to elements of a hardware model can be used to debug a hardware model of a high-level language (HLL) program through simulation using the hardware model.

FIG. 1 shows a debugging system 100 in which the mapping of HLL program information to elements of a hardware model can be used to debug a hardware model of a high-level language (HLL) program through simulation using the hardware model. The system supports interaction between software debuggers, such as the GNU debugger (GDB), and simulation of the hardware accelerator generated from the HLL source code. The view of the simulated hardware accelerator provided by the system is provided by a software debugger in debugging the HLL source code. The system includes a debugger front-end 102, a hardware debug server 106, and a simulator kernel 108. The simulator kernel includes a control interface 112 and simulates the hardware model 110 of the hardware accelerator. The hardware model can be a hardware finite state machine as specified in a register transfer level (RTL) language, for example. The HLL model with memory 114 simulates a memory component of the HLL design that is accessible by the hardware model 110. The hardware debug server and simulator kernel execute on the computer system 104. In one implementation, the debugger front-end can also execute on computer system 104. Alternatively, the debugger front-end can execute on another computer system (not shown) that is coupled to computer system 104 via a network interface to a network, such as a LAN or the Internet. The debugger front-end 102 and hardware debug server 106 can be communicatively coupled using a protocol such as TCP/IP.

Some prior software debuggers, which support debugging software but not hardware accelerators, include a software debug server, which allows a debugger front-end executing on one computer system to control debugging of software executing on another computer system. In one implementation, the debugger front-end 102 can be a part of a generally available software debugger such as the GNU debugger, GDB. The debugger front-end uses debugging information in a standard format, for example DWARF information, in presenting the executing program state in terms of the original HLL source code. Variable names in the HLL source code are displayed with corresponding values read from hardware registers. In an example implementation, the debugger front-end 102 communicates with the hardware debug server 106 using the same protocol as is used for communication with a software debug server. In an implementation involving a debugger front-end from GDB, the debugger front-end communicates with the hardware debug server using the Remote Serial Protocol (RSP), which is the same protocol the debugger front-end from GDB uses for communication with a software debug server.

The hardware debug server 106 translates commands and data between the debugger front-end 102 and the simulator kernel 108. The hardware debug server connects to the simulator kernel via control interface 112 using TCP/IP, for example. The control interface 112 handles communication with the hardware debug server on behalf of the simulator kernel by processing commands and returning values of the simulated hardware model 110. The hardware debug server allows the debugger front-end to execute in the same manner in debugging the hardware model 110 as the debugger front-end would in debugging software. The hardware debug server abstracts the hardware simulation semantics and details and presents a software-oriented view to the user. The simulator kernel 108 can be part of a known circuit design simulator having the adaptations described herein.

The hardware debug sever 106 accesses cross-reference database 116 in translating commands and data between the debugger front-end 102 and the simulator kernel 108. The cross-reference database can be stored as a data structure in a memory of the computer system 104. The information in the database specifies a first mapping of elements of the HLL program to elements of a hardware language finite state machine that represents a circuit implementation of the HLL program. The information in the database further specifies a second mapping of lines of the HLL program to states of the hardware language finite state machine.

In a debugging scenario, the hardware debug server 106 receives from the debugger front-end, a high-level language (HLL) debugging command for setting a breakpoint in an HLL software specification. The person debugging the hardware accelerator interacts with the debugger front-end to select a particular instruction or line number in the HLL software specification from which the hardware model 110 was generated. Those skilled in the art will recognize that known HLS tools can be used to generate a circuit design description and a corresponding hardware model suitable for simulation from HLL source code.

In response to receiving the HLL debugging command, the hardware debug server uses the first and second mappings to translate the HLL debugging command into a hardware debugging command that specifies a condition of a hardware finite state machine, which was generated by the HLS tool from the software specification. The hardware debug server then communicates the hardware debugging command to the control interface 112 for input to the simulator 108. The simulator, in response to the hardware debugging command, adds a conditional breakpoint on the hardware finite state machine. In executing a simulation of the hardware finite state machine, the simulator suspends execution of the simulation in response to the detecting the condition in the finite state machine.

Once execution of the simulation is suspended upon detecting the condition in the hardware finite state machine, the simulator communicates the suspension to the hardware debug server, and the hardware debug server uses the second mapping to determine the line number, instruction or statement of the HLL software specification that corresponds to the condition in the RTL finite state machine. The hardware debug server then outputs the HLL line number, instruction or statement of the HLL software specification and an indication of the breakpoint to the debugger front-end.

In some instances the simulated hardware accelerator can be part of a system design in which a global memory is accessed by the hardware accelerator and by other hardware and/or software components of the system. Large memories are often simulated by using HLL code (HLL memory model 114) that is accessed by HLS-generated components (including the hardware accelerator) via a direct programming interface (DPI). A person operating the debugger front-end 102 may want to inspect the values of HLL variables stored in the HLL memory model. However, the simulator kernel 108 would not have direct access to the HLL memory model even though the HLS-generated components can access the HLL memory while the simulation is executing. In order to provide direct access to the HLL memory model 114 by the simulator kernel 108, the simulator kernel is adapted to register callback functions for accessing (i.e., reading or writing) the memory. When the hardware debug server receives an HLL debugging command that requests a value of a variable of the HLL software specification and that variable is stored in the HLL memory model, the simulator executes the callback function to read the value of the signal by the simulator from the memory. The hardware debug server outputs the value of the variable and the HLL variable name to the debugger front-end.

Figure 2:
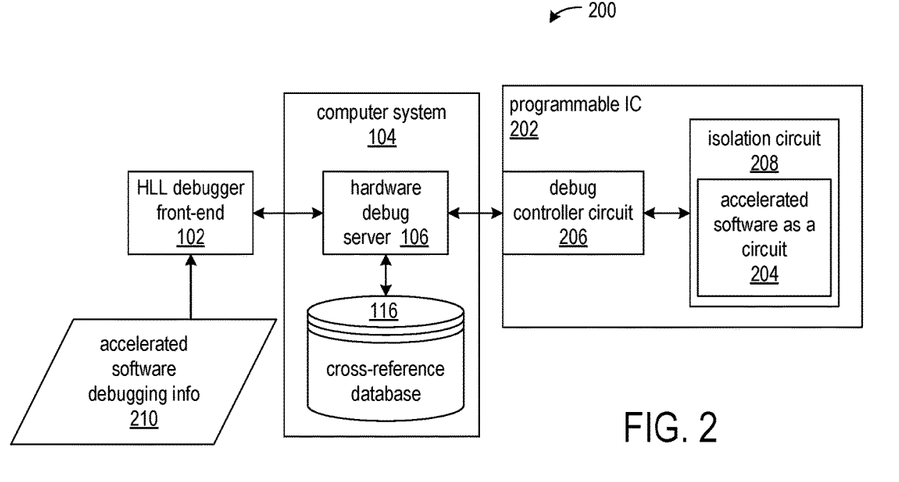
FIG. 2 shows a debugging system in which the mapping of software debugging information to elements of a hardware model and to storage elements can be used to debug a circuit implementation of an HLL program through controlled operation of the circuit implementation.

FIG. 2 shows a debugging system 200 in which the mapping of software debugging information to elements of a hardware model and to storage elements can be used to debug a circuit implementation of an HLL program through controlled operation of the circuit implementation. The system supports interaction between software debuggers, such as GDB, and the hardware accelerator generated from the HLL source code. The view of the hardware accelerator provided by the system is provided by a software debugger in debugging the HLL source code. The system includes an HLL debugger front-end 102, a hardware debug server 106, and a programmable IC 202 on which the hardware accelerator 204 and debug controller circuit 206 are implemented.

The hardware debug server 106 translates commands and data between the debugger front-end 102 and the debug controller circuit 206. The hardware debug server connects to the debug controller circuit via a bus interface, such as PCIe, for example. The debug controller circuit controls the clock signal to the hardware accelerator 204, which is the circuit implemented from the HLL program code, and handles interactions between the hardware debug server and the hardware accelerator by processing commands and returning values from the hardware accelerator. The hardware debug server allows the HLL debugger front-end to execute in the same manner in debugging the hardware accelerator as the HLL debugger front-end would in debugging software. The hardware debug server abstracts the hardware simulation semantics and details and presents a software-oriented view to the user.

In generating the hardware accelerator 204, an HLS tool also generates isolation circuit 208, which provides the input and output interfaces to the hardware accelerator. The isolation circuit conforms to the interfaces specified in the HLL program code and is used to provide a barrier between the hardware accelerator and the rest of the circuitry on the programmable IC 202. The isolation circuit allows the debug controller circuit 206 to stop the clock signal to the hardware accelerator when in step mode or when a breakpoint has been hit, while the clock signal provided to other circuitry on the programmable IC remains active.

The accelerated software debugging information 210 is provided to the HLL debugger front-end 102 and includes the debugging symbols used to debug the source HLL program code from which the hardware accelerator 204 was generated. In an example implementation, the accelerated software debugging information 210 can be DWARF information generated by an HLS tool. The HLS tool generates an intermediate representation of the HLL program code and before optimization passes the intermediate representation through a process that generates a CPU-targeted executable and associated debugging information 210.

The accelerated software debugging information 210 is also used by the hardware debug server 106 in constructing the cross-reference database 116. The cross-reference database includes the accelerated software debugging information cross-referenced with the elements of an RTL state machine generated from the HLL program code.

The hardware debug sever 106 accesses the cross-reference database 116 in translating commands and data between the debugger front-end 102 and the debug controller circuit 206. As described above, the information in the database specifies a first mapping of elements of the HLL program to elements of a hardware language finite state machine that represents a circuit implementation of the HLL program, and a second mapping of lines of the HLL program to states of the hardware language finite state machine. For debugging the hardware accelerator 204, the information in the database further specifies a third mapping of elements of the hardware language finite state machine to locations of storage elements in the programmable IC. The locations of the storage elements correspond to the storage elements employed by the hardware accelerator.

In a debugging scenario, the hardware debug server 106 receives from the debugger front-end, a high-level language (HLL) debugging command for setting a breakpoint in an HLL software specification. The person debugging the hardware accelerator interacts with the debugger front-end to select a particular instruction or line number in the HLL software specification from which the hardware accelerator 108 was generated. Those skilled in the art will recognize that known HLS tools can be used to generate a circuit design description and a corresponding hardware model suitable for simulation from HLL source code.

In response to receiving the HLL debugging command, the hardware debug server uses the collection of mapping information in the cross-reference database to translate the HLL debugging command into a hardware debugging command that specifies a condition and one or more storage elements on the programmable IC 202 at which the one or more values of the condition are stored. The hardware debug server then communicates the hardware debugging command to the debug controller circuit 206. The debug controller circuit, in response to the hardware debugging command, determines after each cycle of the clock signal provided to the hardware accelerator, whether or not the condition of the breakpoint is satisfied. The breakpoint command specifies a storage element(s) of the programmable IC, and after generating a single pulse of the clock signal, the debug controller circuit reads a value(s) from the storage element(s). If the value(s) satisfy the condition of the breakpoint, the debug controller circuit suspends generation of clock pulses to the hardware accelerator and outputs a signal to the hardware debug server 106. If operating in a single-step mode, the debug controller circuit waits for another command from the hardware debug server.

When the breakpoint is communicated to the hardware debug server, the hardware debug server determines the line number, instruction or statement of the HLL software specification that corresponds to the breakpoint. The hardware debug server then outputs the HLL line number, instruction or statement of the HLL software specification and an indication of the breakpoint to the HLL debugger front-end.

Figure 3:
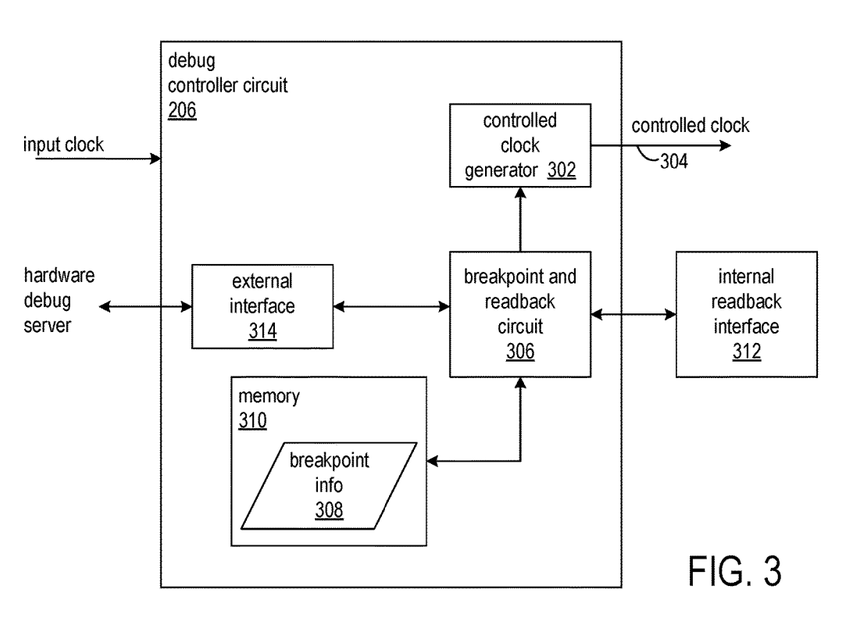
FIG. 3 shows a circuit diagram of a debug controller circuit in accordance with one implementation.

FIG. 3 shows a circuit diagram of a debug controller circuit 206 in accordance with one implementation. The debug controller circuit can be implemented either in programmable logic resources of the programmable IC or as a hardwired circuit. The controlled clock generator 302 of the debug controller circuit is configured to generate a controlled clock signal 304 that can be stopped, single-pulsed, or allowed to run freely at the frequency of the clock signal provided to the programmable IC. The controlled clock is provided to the hardware accelerator and gives the debug controller circuit the ability to step, halt, or freely run the hardware accelerator. The debug controller also has access to the configuration memory of the programmable IC, allowing for the reading and writing of values of variables in the HLL program. With the combination of a controlled clock and access to the configuration memory, the debug controller circuit implements hardware breakpoints and watchpoints by checking conditions after every cycle of the controlled clock signal.

The breakpoint and readback circuit 306 of the debug controller receives instructions via an external interface circuit 314, such as an AXI bus connection. The external interface circuit is also used to send variable data back and report when breakpoints have been hit. The debug controller circuit accepts instructions from the external interface, interprets the instructions, and performs the actions specified by the instructions. Commands to set a breakpoint, stop the hardware accelerator, run the hardware accelerator, read a variable, or run in breakpoint stepping mode are all accepted from the external interface.

When the debug controller receives an instruction to set a breakpoint, the breakpoint and readback circuit 306 stores breakpoint frame and offset information ("breakpoint info") 308 inside a local memory 310. The breakpoint information can specify frames and offsets of configuration memory elements ("frame-offset pairs") of the programmable IC, and values that comprise a condition to check.

After the debug controller circuit has been programmed with breakpoint information, a start instruction causes the breakpoint and readback circuit 306 to start operation in debug mode. In debug mode, the breakpoint and readback circuit signals the controlled clock generator 302 to pulse the controlled clock signal once, which advances operation of the hardware accelerator by one clock cycle. After the pulse, the breakpoint and readback circuit generates signals to the configuration access interface circuit 312 for reading from configuration memory of the programmable IC. The configuration access interface circuit can be a circuit that is included as a standard feature on a programmable IC.

The breakpoint and readback circuit 306 reads the breakpoint information 308 from the memory 310 in order to determine which locations in configuration memory are to be read. The breakpoint and readback circuit issues a read command to the configuration access interface 312, which reads the specified frames of configuration memory. Once the frames of data values are returned by the configuration access interface 312, the breakpoint and readback circuit parses the frame data and compares values at the designated offsets with the values of the breakpoint information read from the memory 308. When a condition of a breakpoint is satisfied, the breakpoint and readback circuit signals the controlled clock generator 302 to stop further pulsing of the controlled clock signal 304, and reports a breakpoint hit to the hardware debugger server via the external interface circuit 314. If no condition of a breakpoint is satisfied and the debug clock mode is free-running, the breakpoint and readback circuit clock signals the controlled clock generator 302 to once again single pulse the controlled clock signal 314, and the process repeats. If no condition of a breakpoint is satisfied and the debug clock mode is single-step, the breakpoint and readback circuit waits for another command from the hardware debug server and does not signal the controlled clock generator 302 to single pulse the controlled clock signal until either a run or step command is received.

Figure 4:
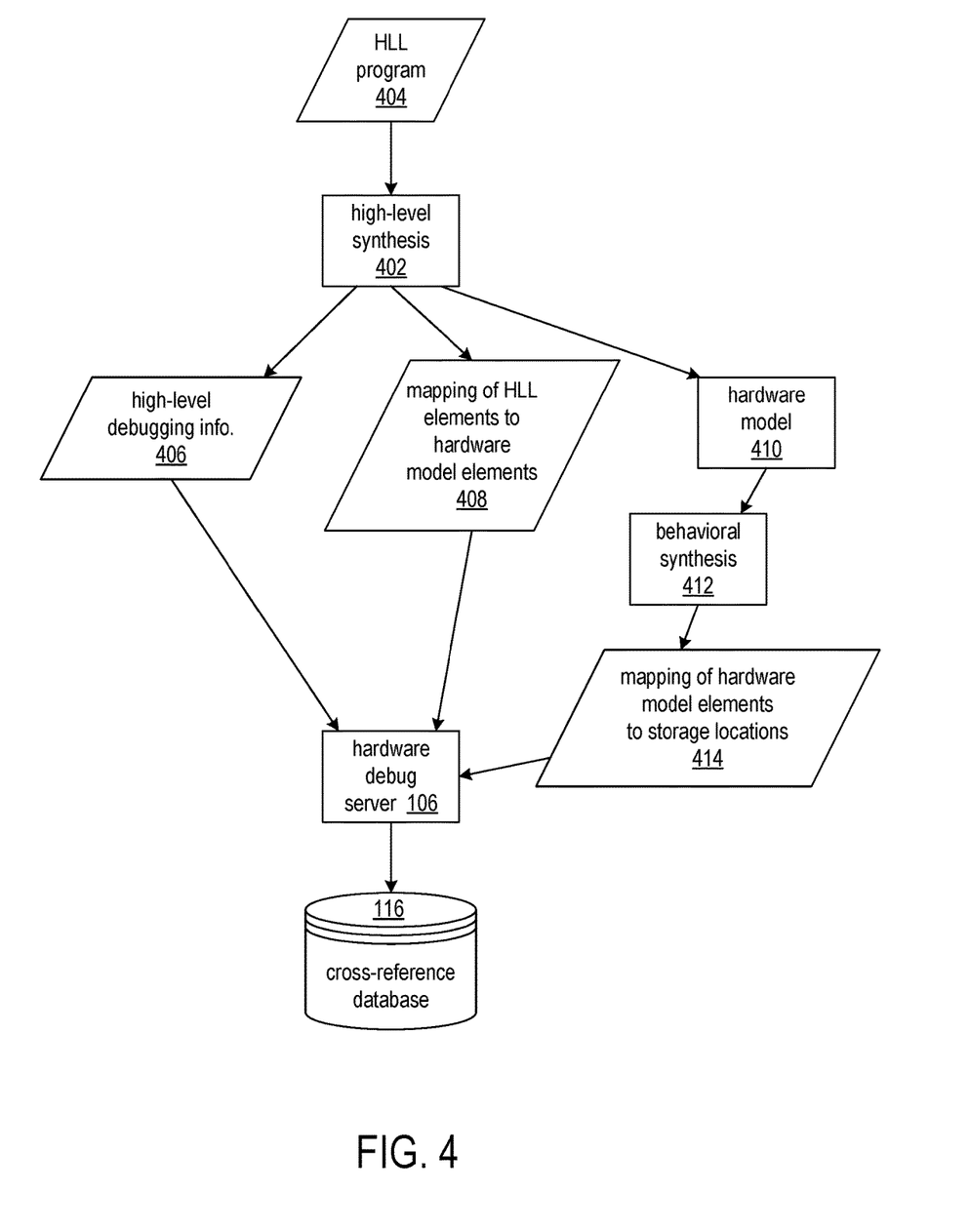
FIG. 4 is a dataflow diagram that illustrates generation of the cross-reference database.

FIG. 4 is a dataflow diagram that illustrates generation of the cross-reference database 116. The HLS tool 402 inputs the HLL program 404, which specifies the function to be implemented by a hardware accelerator. The HLS tool generates multiple versions of debugging information for use by the hardware debug server 106. At the beginning of the HLS tool flow, after front-end parsing but before optimization, the HLS tool generates an executable program (not shown) that is targeted to a particular CPU. The executable has associated high-level debugging information 406 which is used to provide to the HLL debugger front-end (FIG. 1, #102), symbols relevant to the original HLL program 404. The high-level debugging information is also used by the hardware debug server 106 in building the cross-reference database 116. In one implementation, the high-level debugging information is DWARF debugging information.

In the optimization and scheduling passes of the HLS tool 402, the HLS tool generates the mapping information 408 and hardware model 410. The mapping information 408 specifies associations between elements of HLL program 404 and elements in the hardware model. The mappings can be HLL data types to RTL types, HLL state register configurations to RTL signal names, and HLL line numbers to conditions or states of the hardware model. The hardware model in one implementation can be an RTL finite state machine in which an active state specifies those statements of the HLL program processed concurrently during simulation.

The behavioral synthesis tool 412 inputs the hardware model 410 and in the process of generating configuration data for programming the programmable IC to implement the hardware accelerator, also generates a mapping 414 of elements of the hardware model to elements or storage locations of configuration memory of the programmable IC. For example, the mapping information can specify elements of an RTL finite state machine mapped to frames and offsets of configuration memory of programmable logic.

The hardware debug server 106 inputs the high-level debugging information 406, mapping information 408, and mapping information 414 and generates cross-reference database 116, which cross-references the high-level debugging information 406 with the mapping of HLL elements to elements of the hardware model 408. The cross-reference database also includes mapping information that cross references the elements of the hardware model with storage locations/elements of the programmable IC. The database 116 can be queried by the hardware debug server 106 during simulation of the hardware accelerator or debugging of the circuit implementation of the hardware accelerator.

Figure 5:
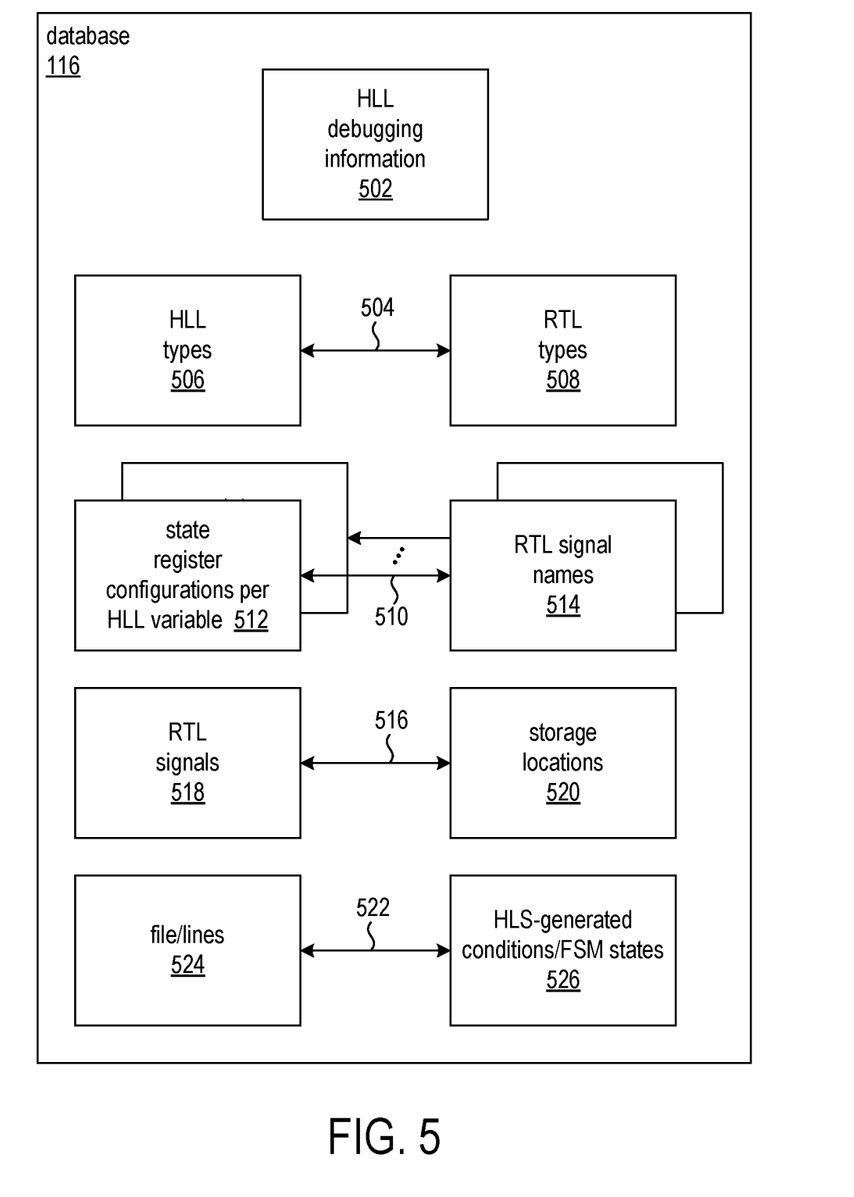
FIG. 5 shows the mapped information in the cross-reference database.

FIG. 5 shows the mapped information in the cross-reference database 116. The cross-reference database includes HLL debugging information 502, a mapping 504 of HLL types 506 to RTL types 508, a mapping 510 of HLL variable state register configurations 512 to RTL signal names 514, a mapping 516 of RTL signals 518 to storage locations 520, and a mapping 522 of file/lines 524 of the HLL program to conditions or states 526 of the finite state machine.

The HLL debugging information can be implemented as DWARF information, for example. The HLL debugging information generally includes identifiers of elements of the HLL program and descriptive attributes, such as target architecture-specific definitions of different data types; names, types, and locations of variables; function/subroutine information; mapping of addresses of executable instructions to the corresponding source code lines; and call frame information.

Variables in the HLL program level have an intricate type system built on concrete base types defined by the language. When high level language programs are synthesized using HLS tools, the generated hardware will typically have the HLL types optimized and flattened into bit vectors. For example, the HLS tool might determine that a variable declared as "int" in the high level language only uses the seventeen low order bits and synthesize hardware that contains seventeen bit registers and bit-vectors as opposed to the thirty-two bit registers expected by the high level language.

The HLS tool captures the transformation of types in order to provide a mapping 504 of the HLL types 506 to RTL types 508. Table 1 shows a textual view of the mapping information of HLL types to RTL types. A direct mapping of each RTL type to the original type implies a conversion rule, such as sign extension or zero-extension. Additionally, the HLS tool may make the decision to create hardware where an HLL type is stored in many different RTL registers or signals; the mapping specifies how these many RTL signals are assembled back into the original high level representation. The implementation and storage of this mapping can be done through a binary encoding.

TABLE 1

| HLL Type | RTL Type | Conversion Rule |
| --- | --- | --- |
| int | [16:0] logic | Sign extend to 32-bits |
| float | [31:0] logic | Interpret 32-bits as floating point number |
| unsigned long long int | Two 32-bit logic vectors | Append vector 1 to vector 2 |

In the HLS-generated RTL, an HLL variable may be implemented as not just a single register, but as multiple registers and signals that are active at different clock cycles or may all be simultaneously active based upon pipelining decisions made by the HLS tool. The mapping 510 specifies the set of registers and signals that make up the state register for the finite state machine and any pipeline stage activation registers. Table 2 shows and example of a mapping location of location information for the HLL variable, "counter."

TABLE 2

| Finite State Machine + Pipeline configuration | Locations |
| --- | --- |
| 00001a78 | vadd_counter_reg_101 |
| 00001af* | ap_pipeline_reg_pp0 _iter1_vadd_counter_reg_101 |
| 00001ff* | vadd_counter_reg_101, vadd_counter_reg_99 |
| <End of list> | |

For every HLL variable, the HLS tool creates a mapping from different configurations of these state registers to a list of other RTL signals that represent the active signals where that variable is located at that clock cycle. The textual example shown in Table 2 represents the binary encoding of the meta-data output by the HLS tool and includes wildcards to represent all permutations of particular bits as being valid for a single mapping. Each entry in the first column includes all of the FSM register bits concatenated with all of the pipeline configuration bits, with the result treated as a number. In the examples of Table 2, there are a total of 32 distinct register and pipeline configuration bits spread amongst a set of 32 distinct RTL variables. The HLS tool provides the identification of the 32 distinct RTL variables, an ordering, and the locations of the "counter" variable for all the different possible configurations of those 32 RTL variables.

The construction of the mapping of lines in the HLL program 404 to which a breakpoint can be applied, to corresponding hardware state machine elements is dependent on the structure of the HLS-generated hardware model 410. In one implementation, the hardware model includes a finite state machine in which HLL statements correspond to conditions on RTL signals. By querying the cross-reference database 116, the hardware debug server 106 can translate breakpoint commands from the HLL debugger front-end into equivalent conditions on the hardware finite state machine. The conditions on the hardware finite state machine can then be translated into conditions on storage locations/elements of the programmable IC. The translated breakpoint information can be input to the debug controller circuit 206, which stores the conditional breakpoint information in the local memory 310. The hardware debug server can translate commands from the software debugger front-end in which the commands request values of variables, into requests for values of hardware signals and variables from the debug controller by querying the cross-reference database.

Each line of source code in the original HLL program starts execution in the RTL code when a certain FSM state is active. States in the FSM are active when a certain RTL condition is true, such as when the state registers are in a certain configuration and when memory fetches have completed.

Table 3 shows an example of mapping 522. The cross-reference database maintains a mapping of identifiers of lines in the original HLL program to conditions in the generated RTL model that correspond to configurations that represent when an FSM state starts execution, including any generated pipeline information. Note that the mapping in some instances may be many-to-one, because the generated RTL model may start several statements simultaneously or out of order in order to best utilize the available resources and maximize throughput.

TABLE 3

| High Level Language Breakable Lines | HLS-Generated Conditions/FSM States |
| --- | --- |
| main.c:5 | CS_state13 == 1 && memReady == 1 |
| main.c:6 | CS_state13 == 1 && memReady == 1 |
| main.c:7 | CS_state155 == 1 |
| kernel.cpp:15 | CS_state16 == 1 && Pipeline_16 == 1 |

The HLS tool converts pointer variables in the HLL program into RTL registers and signals. The actual memory that implements the pointer variables can be local RAM on the programmable IC or attached DDR memory. The mapping information output by the HLS tool and stored in the cross-reference database specifies the memory space partitioning and allocation so that the hardware debug server can dereference the pointers and follow the links to the stored values.

In order to support a software-centric view of the hardware accelerator circuitry operating on a programmable IC, elements of the hardware model are mapped to storage locations/elements of the programmable IC that implement the elements of the hardware model. The mapping information is generated during synthesis, place-and-route, and bitstream generation. The mapping information provides a direct link from the signals of the hardware model to storage locations/elements in the programmable IC. For example, in an FPGA, the storage locations/elements are specified as frames and offsets of the configuration memory. The mapping information supports inspection of the hardware accelerator during debug operations by way of user specification of variables and lines of code in the HLL program.

Table 4 shows an example of the mapping 516 of the associations between RTL signals and particular frames and offsets in configuration memory of the programmable IC on which the RTL signals are implemented.

TABLE 4

| Signal | Frame in configuration memory | Offset in frame |
| --- | --- | --- |
| Top/design/vadd/counter[0] | 0x00021d9f | 2370 |
| Top/design/vadd/counter[1] | 0x00021de0 | 2200 |
| Top/design/vadd/axi/WREADY | 0x00021d9f | 2374 |

Figure 6:
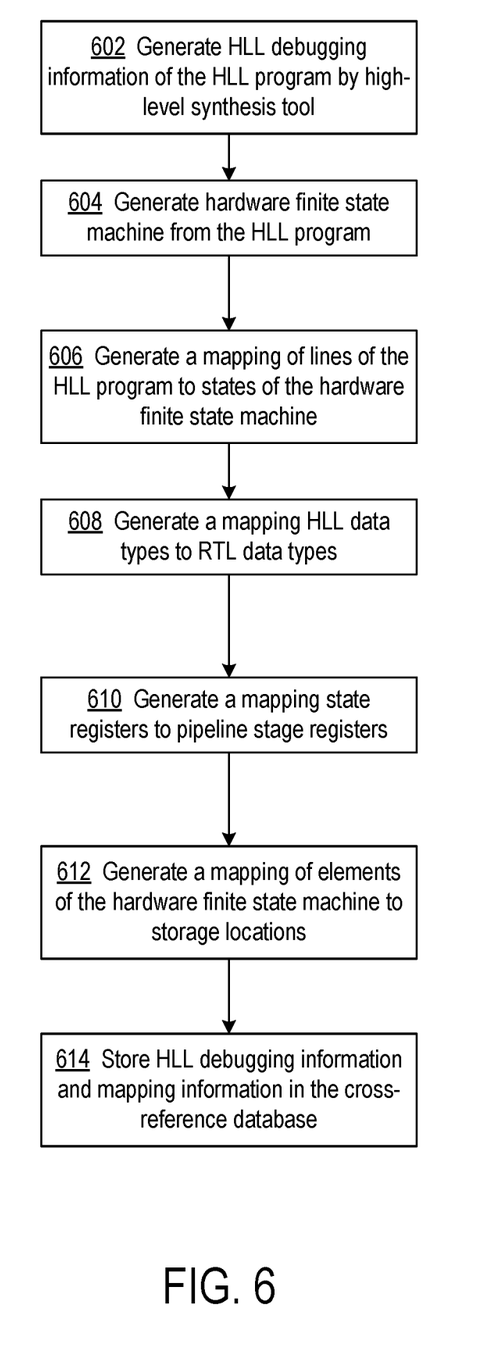
FIG. 6 is flowchart of a process of generating the data for the cross-reference database.

FIG. 6 is flowchart of a process of generating the data for the cross-reference database 116. At block 602, a high-level synthesis (HLS) tool generates high-level debugging information from an HLL program. The high-level debugging information can be DWARF debugging information as is known in the art. At block 604, the HLS tool generates a hardware model of the HLL program. The hardware model can be an RTL finite state machine, for example. At block 606, the HLS tool generates a mapping 522 of HLL line numbers to conditions or states of the hardware model. The mapping 504 of HLL data types to RTL data types is generated by the HLS tool at block 608. At block 610, the HLS tool generates the mapping 510 of FSM state registers to pipeline stage registers. At block 612, the behavioral synthesis tool generates a mapping 516 of elements of the hardware model to elements or storage locations of configuration memory of the programmable IC.

Before the hardware debug server is used in simulation of a hardware model, the hardware debug server inputs the high-level debugging information of the HLL program from which the hardware model was generated and inputs the mapping information generated in blocks 606-612. At block 614, the hardware debug server stores the information in cross-reference database 116.

Figure 7:
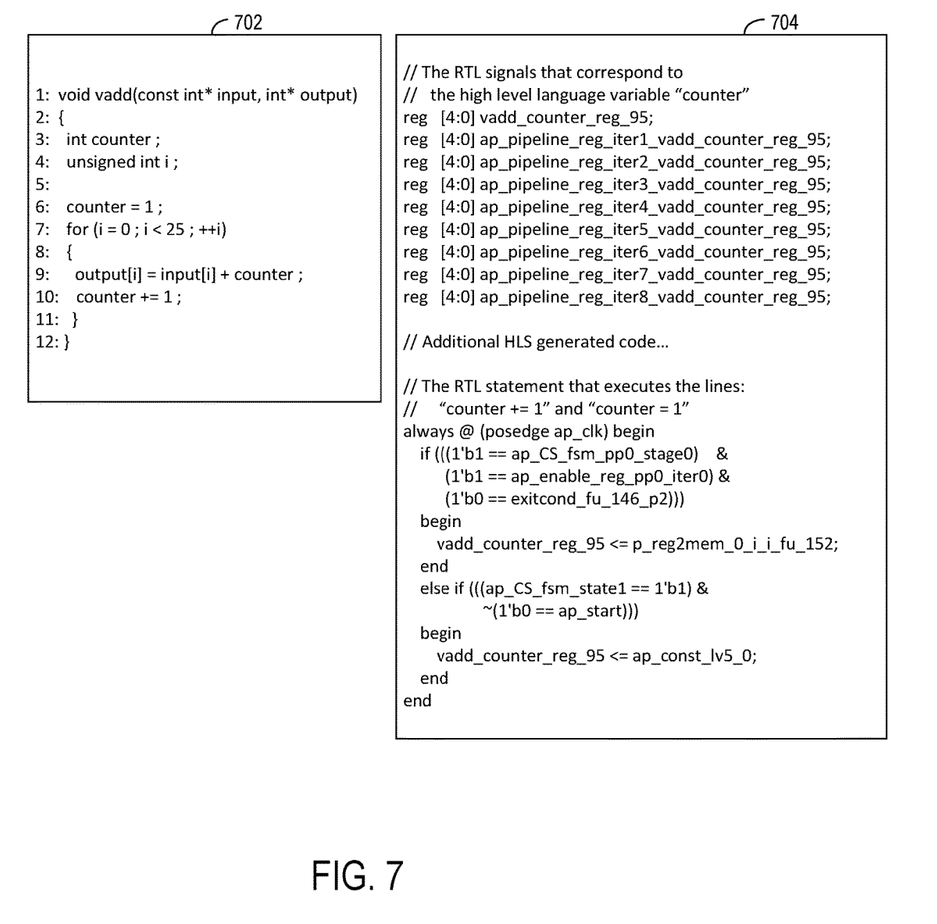
FIG. 7 shows an example of HLL source code and the equivalent sections of the HLS-generated RTL code.

FIG. 7 shows an example of HLL source code 702 and the equivalent sections of the HLS-generated RTL code 704 dealing with HLL program variable, "counter." The HLL source code has 12 numbered lines including a function statement, variable declarations, assignment statements, a control statement, scope delimiters, and a blank line.

The HLL variable "counter" maps to the 5-bit registers in RTL, each of which is active during different stages of the generated FSM machine. The registers include:

reg [4:0] vadd_counter_reg_95;
reg [4:0] ap_pipeline_reg_iter1_vadd_counter_reg_95;
reg [4:0] ap_pipeline_reg_iter2_vadd_counter_reg_95;
reg [4:0] ap_pipeline_reg_iter3_vadd_counter_reg_95;
reg [4:0] ap_pipeline_reg_iter4_vadd_counter_reg_95;
reg [4:0] ap_pipeline_reg_iter5_vadd_counter_reg_95;
reg [4:0] ap_pipeline_reg_iter6_vadd_counter_reg_95;
reg [4:0] ap_pipeline_reg_iter7_vadd_counter_reg_95;
reg [4:0] ap_pipeline_reg_iter8_vadd_counter_reg_95;

The HLL statement, counter+=1; maps to the "if" portion of the always block and the RTL statement, vadd_counter_reg_95<=p_reg2mem_0_i_i_fu_152;

is executed in the simulation when the condition (ap_CS_Jsm_pp0_stage0==1'b1) & (ap_enable_reg_pp0_iter0==1'b1) & (exitcond_fu_146_p2==1'b0) is true on a positive edge of the main clock.

The HLL statement, counter=1; maps to the "else if" portion of the always block, and the RTL statement, vadd_counter_reg_95<=ap_const_lv5_0;

is executed in the simulation when the condition, (ap_CS_fsm_state1==1'b1) & ~(ap_start==1'b0) is true on a positive edge of the main clock.

In response to receiving from the debugger front-end 102 breakpoint commands specifying the HLL lines 6 and 10, the hardware debug server translates the HLL breakpoint commands into the corresponding RTL simulator breakpoint commands that specify the RTL conditions and submits the commands to the control interface 112. The control interface of the simulator kernel adds the breakpoints to stop the simulation before the RTL statements are executed in the simulation. In response to a command from the debugger front-end to set a breakpoint at HLL code line 6, the hardware debug server generates simulator kernel command that sets a breakpoint that causes the simulation to stop when the condition (ap_CS_fsm_state1==1'b1) & ~(ap_start==1'b0) is true on a positive edge of the main clock, which is before the RTL statement vadd_counter_reg_95<=ap_const_lv5_0; is executed in the simulation. In response to a command from the debugger front-end to set a breakpoint at HLL code line 10, the hardware debug server generates simulator kernel command that sets a breakpoint that causes the simulation to stop when the condition (ap_CS_Jsm_pp0_stage0==1'b1) & (ap_enable_reg_pp0_iter0==1'b1) & (exitcond_fu_146_p2==1'b0) is true on a positive edge of the main clock, which is before the RTL statement, vadd_counter_reg_95<=p_reg2mem_0_i_i_fu_152; is executed in the simulation.

Figure 8:
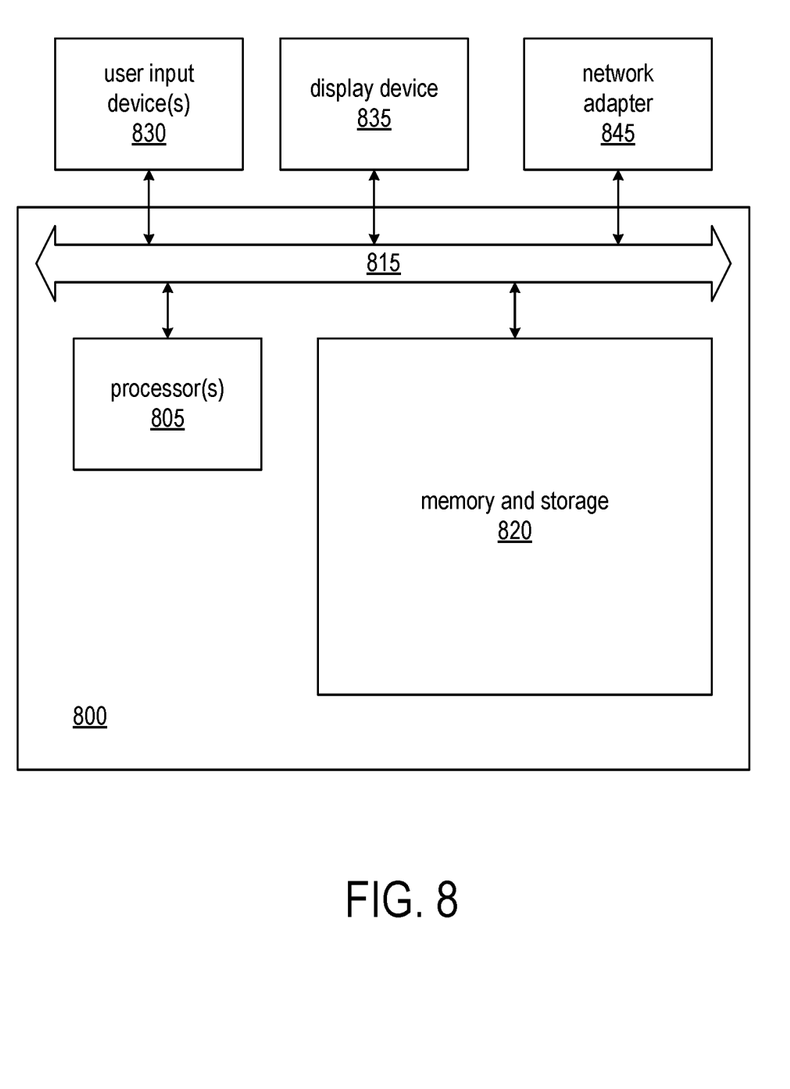
FIG. 8 is a block diagram illustrating an exemplary data processing system on which the hardware debug server, simulator kernel, HLS tool, and behavioral synthesis tool can be implemented.

FIG. 8 is a block diagram illustrating an exemplary data processing system (system) 800 on which the hardware debug server 106, simulator kernel 108, HLS tool 402, and behavioral synthesis tool 412 can be implemented. System 800 includes at least one processor circuit (or "processor"), e.g., a central processing unit (CPU) 805 coupled to memory and storage arrangement 820 through a system bus 815 or other suitable circuitry. System 800 stores program code that implements the hardware debug server, simulator kernel, HLS tool, and behavioral synthesis tool. Processor 805 executes the program code accessed from the memory and storage arrangement 820 via system bus 815. In one aspect, system 800 is implemented as a computer or other data processing system that is suitable for storing and/or executing program code. It should be appreciated, however, that system 800 can be implemented in the form of any system including a processor and memory that is capable of performing the functions described within this disclosure.

Memory and storage arrangement 820 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 800 may also include one or more cache memories (not shown) that provide temporary storage of at least some program code and data in order to reduce the number of times program code and data must be retrieved from local memory and persistent storage during execution.

Input/output (I/O) devices such as user input device(s) 830 and a display device 835 may be optionally coupled to system 800. The I/O devices may be coupled to system 800 either directly or through intervening I/O controllers. A network adapter 845 also can be coupled to system 800 in order to couple system 800 to other systems, computer systems, remote printers, and/or remote storage devices through intervening private or public networks. Modems, cable modems, Ethernet cards, and wireless transceivers are examples of different types of network adapter 845 that can be used with system 800.

Figure 9:
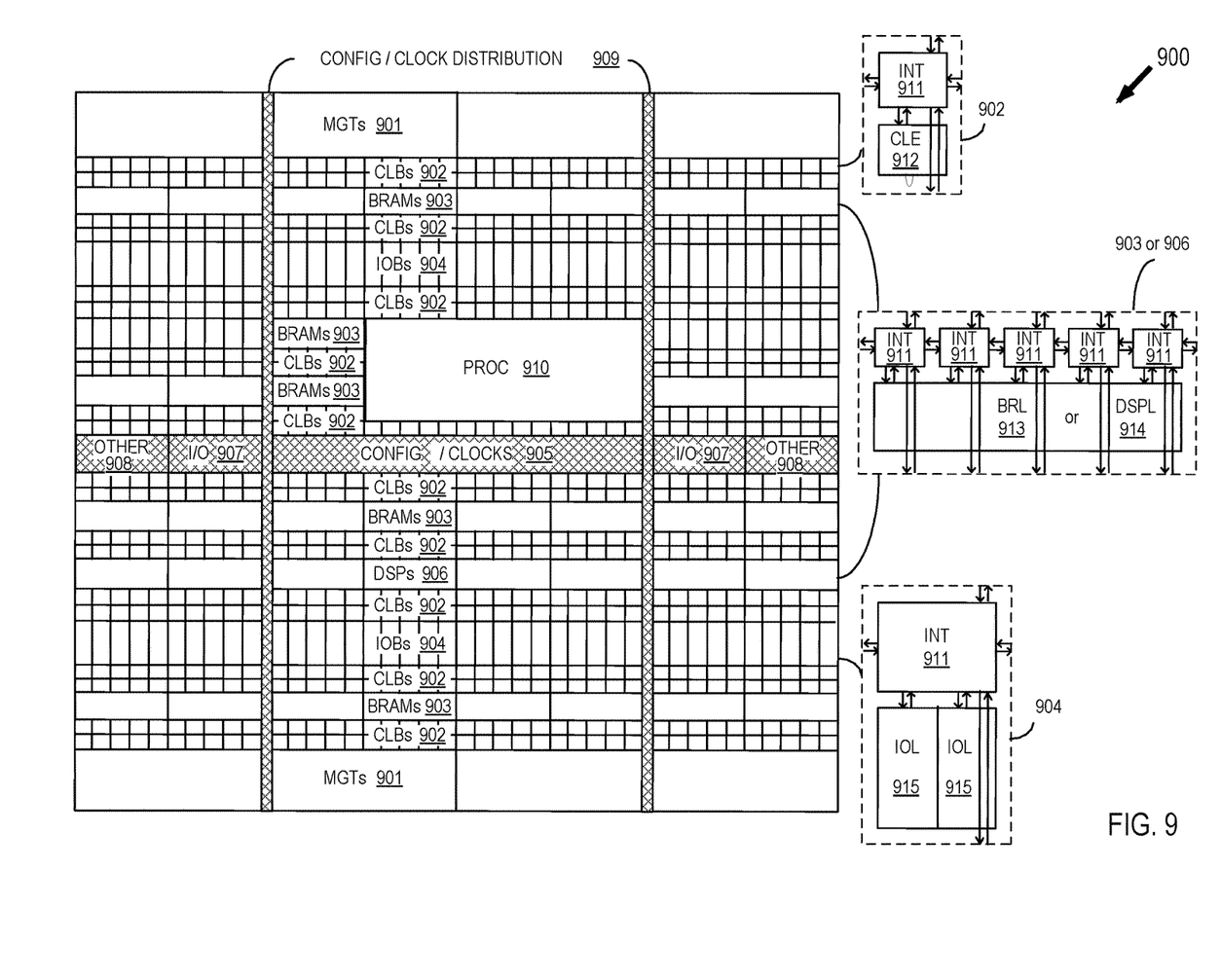
FIG. 9 shows a programmable integrated circuit (IC) on which the disclosed hardware accelerator and debug controller circuit can be implemented.

FIG. 9 shows a programmable integrated circuit (IC) 900 on which the disclosed hardware accelerator and debug controller circuit can be implemented. The programmable IC may also be referred to as a System On Chip (SOC) that includes field programmable gate array logic (FPGA) along with other programmable resources. FPGA logic may include several different types of programmable logic blocks in the array. For example, FIG. 9 illustrates programmable IC 900 that includes a large number of different programmable tiles including multi-gigabit transceivers (MGTs) 901, configurable logic blocks (CLBs) 902, random access memory blocks (BRAMs) 903, input/output blocks (IOBs) 904, configuration and clocking logic (CONFIG/CLOCKS) 905, digital signal processing blocks (DSPs) 906, specialized input/output blocks (I/O) 907, for example, clock ports, and other programmable logic 908 such as digital clock managers, analog-to-digital converters, system monitoring logic, and so forth. Some programmable IC having FPGA logic also include dedicated processor blocks (PROC) 910 and internal and external reconfiguration ports (not shown).

In some FPGA logic, each programmable tile includes a programmable interconnect element (INT) 911 having standardized connections to and from a corresponding interconnect element in each adjacent tile. Therefore, the programmable interconnect elements taken together implement the programmable interconnect structure for the illustrated FPGA logic. The programmable interconnect element INT 911 also includes the connections to and from the programmable logic element within the same tile, as shown by the examples included at the top of FIG. 9.

For example, a CLB 902 can include a configurable logic element CLE 912 that can be programmed to implement user logic, plus a single programmable interconnect element INT 911. A BRAM 903 can include a BRAM logic element (BRL) 913 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 906 can include a DSP logic element (DSPL) 914 in addition to an appropriate number of programmable interconnect elements. An IOB 904 can include, for example, two instances of an input/output logic element (IOL) 915 in addition to one instance of the programmable interconnect element INT 911. As will be clear to those of skill in the art, the actual I/O bond pads connected, for example, to the I/O logic element 915, are manufactured using metal layered above the various illustrated logic blocks, and typically are not confined to the area of the input/output logic element 915.

In the pictured embodiment, a columnar area near the center of the die (shown shaded in FIG. 9) is used for configuration, clock, and other control logic. Horizontal areas 909 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 9 include additional logic blocks that disrupt the regular columnar structure making up a large part of the programmable IC. The additional logic blocks can be programmable blocks and/or dedicated logic. For example, the processor block PROC 910 shown in FIG. 9 spans several columns of CLBs and BRAMs.

Note that FIG. 9 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual programmable IC, more than one adjacent column of CLBs is typically included wherever the CLBs appear, to facilitate the efficient implementation of user logic.

Certain implementations are directed to a computer program product (e.g., nonvolatile memory device), which includes a machine or computer-readable medium having stored thereon instructions which may be executed by a computer (or other electronic device) to perform these operations/activities.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for debugging circuits implemented from HLL programs. Other aspects and features will be apparent to those skilled in the art from consideration of the specification. It is intended that the specification and drawings be considered as examples only, with a true scope of the invention being indicated by the following claims.

What is claimed is:

1. A method, comprising:
storing a data structure in a memory of a data processing system for access by a debugging program executing on the data processing system;
the data structure including information resident in a database used by the debugging program and including:
a first mapping of elements of a high-level language (HLL) program to elements of a register transfer language (RTL) finite state machine that represents a circuit implementation of the HLL program; and
a second mapping of line numbers of lines of the HLL program to states of the RTL finite state machine;
determining by the debugging program from the second mapping, a state of the RTL finite state machine corresponding to line number in an HLL debugging command that specifies setting a breakpoint at the line number;
setting the breakpoint on the state of the RTL state machine;
simulating the circuit implementation of the HLL program using the RTL state machine; and
suspending the simulation in response to activation of the state of the RTL finite state machine.

2. The memory of claim 1, wherein the data structure further includes a third mapping of elements of the RTL finite state machine to locations of storage elements in a programmable integrated circuit (IC), wherein the locations of the storage elements correspond to the circuit implementation of the HLL program on the programmable IC.

3. The memory of claim 1, wherein the data structure further includes a third mapping of HLL data types to RTL data types.

4. The memory of claim 1, wherein the first mapping includes for at least one variable of the HLL program, a plurality of states of a state register of the finite state machine mapped to a plurality of pipeline stage registers.

5. The memory of claim 1, further comprising wherein the data structure further includes HLL debugging information describing the HLL program, the HLL debugging information including identifiers of elements of the HLL program.

6. The memory of claim 1, wherein the data structure further includes a third mapping of elements of the RTL finite state machine to frame-offset pairs, and each frame-offset pair identifies a frame of configuration memory cells of a programmable integrated circuit (IC) and an offset within the frame.

7. The memory of claim 1, wherein the second mapping of lines of the HLL program to states of the RTL finite state machine includes for each line of HLL program code, an identifier of the line of HLL program code and an associated condition in the RTL finite state machine.

8. The memory of claim 7, wherein the second mapping includes at least one mapping of two or more lines of HLL program code to one associated condition in the RTL finite state machine.

9. A method, comprising:
generating by a high-level synthesis tool executing on a computer system, a first mapping of elements of a high-level language (HLL) program to elements of a register transfer language (RTL) finite state machine that represents a circuit implementation of the HLL program;
generating by a hardware debug server, a second mapping of line numbers of lines of the HLL program to states of the RTL finite state machine;
generating a third mapping of elements of the RTL finite state machine to locations of storage elements in a programmable integrated circuit (IC), wherein the locations of the storage elements correspond to the circuit implementation of the HLL program on the programmable IC;
storing information describing the first mapping, the second mapping, and the third mapping in a data structure of a database in the memory;
determining by a debugging program executing on a data processing system from the second mapping and the third mapping, a location of a storage element of the programmable IC corresponding to line number in an HLL debugging command that specifies setting a breakpoint at the line number;
communicating the breakpoint and the location of the storage element to a debug controller circuit;
operating the circuit implementation on the programmable IC; and
suspending operation of the circuit implementation in response to the storage element having a value indicative of the breakpoint.

10. The method of claim 9, further comprising:
generating a fourth mapping of HLL data types to RTL data types; and
storing information describing the fourth mapping in the data structure.

11. The method of claim 9, wherein the generating the first mapping includes for at least one variable of the HLL program, specifying a plurality of states of a state register of the finite state machine mapped to a plurality of pipeline stage registers.

12. The method of claim 9, further comprising:
generating HLL debugging information describing the HLL program, the HLL debugging information including identifiers of elements of the HLL program; and
storing the HLL debugging information in the data structure.

13. The method of claim 9, further comprising:
generating a fourth mapping of elements of the RTL finite state machine to frame-offset pairs, and each frame-offset pair identifies a frame of configuration memory cells of a programmable integrated circuit (IC) and an offset within the frame; and
storing information describing the fourth mapping in the data structure.

14. The method of claim 9, wherein the generating of the second mapping of lines of the HLL program to states of the RTL finite state machine includes for each line of HLL program code, specifying an identifier of the line of HLL program code and an associated condition in the RTL finite state machine.

15. The method of claim 14, wherein the generating of the second mapping includes specifying at least one mapping of two or more lines of HLL program code to one associated condition in the RTL finite state machine.

16. A debugging system, comprising:
a programmable integrated circuit (IC), wherein the programmable IC is configured by a circuit implementation of a high-level language (HLL) program and a debug controller circuit; and
a processor; and
a memory arrangement coupled to the processor, wherein the memory arrangement is configured with instructions that when executed by the processor cause the processor to perform operations including:

generating a first mapping of elements of the HLL program to elements of a register transfer language (RTL) finite state machine that represents a circuit implementation of the HLL program;

generating a second mapping of line numbers of lines of the HLL program to states of the RTL finite state machine;

generating a third mapping of elements of the RTL finite state machine to locations of storage elements in the programmable IC, wherein the locations of the storage elements correspond to the circuit implementation of the HLL program on the programmable IC;

storing information describing the first mapping, the second mapping, and the third mapping in a data structure of a database in the memory;

determining by a debugging program executing on a data processing system from the second mapping and the third mapping, a location of a storage element of the programmable IC corresponding to line number in an HLL debugging command that specifies setting a breakpoint at the line number;

communicating the breakpoint and the location of the storage element to the debug controller circuit on the programmable IC; and wherein the debug controller circuit is configured to suspend operation of the circuit implementation of the HLL program in response to the storage element having a value indicative of the breakpoint.

17. The system of claim 16, wherein the memory arrangement is further configured with instructions that when executed by the processor cause the processor to:

generate a fourth mapping of HLL data types to RTL data types; and store information describing the fourth mapping in the data structure.

18. The system of claim 16, wherein the instructions for generating the first mapping include for at least one variable of the HLL program, instructions for specifying a plurality of states of a state register of the finite state machine mapped to a plurality of pipeline stage registers.

\* \* \* \* \*